(12) United States Patent
Moon et al.

(10) Patent No.: US 10,514,002 B2
(45) Date of Patent: Dec. 24, 2019

(54) VARIABLE EXHAUST MIXER AND COOLER FOR A THREE-STREAM GAS TURBINE ENGINE

(71) Applicant: United Technologies Corporation, Farmington, CT (US)

(72) Inventors: Francis R. Moon, Granby, CT (US); Daniel B. Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 408 days.

(21) Appl. No.: 15/271,541

(22) Filed: Sep. 21, 2016

(65) Prior Publication Data

US 2017/0009703 A1    Jan. 12, 2017

Related U.S. Application Data

(62) Division of application No. 14/553,284, filed on Nov. 25, 2014, now Pat. No. 10,030,606.

(60) Provisional application No. 61/931,957, filed on Jan. 27, 2014.

(51) Int. Cl.
| | |
|---|---|
| *F02K 1/12* | (2006.01) |
| *F02K 3/077* | (2006.01) |
| *F02K 1/06* | (2006.01) |
| *F02K 1/36* | (2006.01) |
| *F02K 1/46* | (2006.01) |
| *F02K 1/38* | (2006.01) |
| *F02K 3/06* | (2006.01) |

(52) U.S. Cl.
CPC .............. *F02K 1/12* (2013.01); *F02K 1/06* (2013.01); *F02K 1/36* (2013.01); *F02K 1/38* (2013.01); *F02K 1/386* (2013.01); *F02K 1/46* (2013.01); *F02K 3/06* (2013.01); *F02K 3/077* (2013.01); *F05D 2220/323* (2013.01)

(58) Field of Classification Search
CPC ..... F02K 1/06; F02K 1/12; F02K 1/36; F02K 1/38; F02K 1/383; F02K 1/386; F02K 1/46; F02K 3/075; F02K 3/077; F05D 2220/323
See application file for complete search history.

(56) References Cited

U.S. PATENT DOCUMENTS

| | | | | |
|---|---|---|---|---|
| 3,879,941 | A * | 4/1975 | Sargisson | B64D 33/02 137/15.1 |
| 4,064,692 | A * | 12/1977 | Johnson | F02K 3/075 60/762 |
| 4,069,661 | A | 1/1978 | Rundell et al. | |
| 4,285,194 | A | 8/1981 | Nash | |
| 5,435,127 | A * | 7/1995 | Luffy | F02K 1/1223 60/204 |
| 5,694,767 | A | 12/1997 | Vdoviak et al. | |
| 5,806,303 | A | 9/1998 | Johnson | |

(Continued)

*Primary Examiner* — William H Rodriguez
*Assistant Examiner* — Kyle Robert Thomas
(74) *Attorney, Agent, or Firm* — O'Shea Getz P.C.

(57) ABSTRACT

A gas turbine engine includes an outer case structure around a central longitudinal engine axis. An intermediate case structure is included inboard of the outer case structure. An inner case structure is included inboard of the intermediate case structure. A variable area exhaust mixer is included, which is movable between a closed position adjacent to the intermediate case structure and an open position adjacent to the inner case structure.

10 Claims, 12 Drawing Sheets

(56) References Cited

U.S. PATENT DOCUMENTS

| | | |
|---|---|---|
| 5,809,772 A | 9/1998 | Giffin et al. |
| 5,867,980 A | 2/1999 | Bartos |
| 6,442,930 B1 | 9/2002 | Johnson et al. |
| 6,550,235 B2 | 4/2003 | Johnson et al. |
| 6,666,018 B2 * | 12/2003 | Butler .................... F02K 3/075 60/226.1 |
| 6,901,739 B2 | 6/2005 | Christopherson |
| 7,134,271 B2 | 11/2006 | Baughman et al. |
| 7,188,467 B2 | 3/2007 | Johnson |
| 7,216,475 B2 | 5/2007 | Johnson |
| 7,246,484 B2 | 7/2007 | Giffin et al. |
| 7,395,657 B2 | 7/2008 | Johnson |
| 7,730,714 B2 | 6/2010 | Wood et al. |
| 7,758,303 B1 | 7/2010 | Wadia et al. |

* cited by examiner

VARIABLE EXHAUST MIXER AND COOLER FOR A THREE-STREAM GAS TURBINE ENGINE

CROSS-REFERENCE TO RELATED APPLICATIONS

This application is a divisional of U.S. patent application Ser. No. 14/553,284 filed Nov. 25, 2014, which claims priority to U.S. Provisional Patent Application Ser. No. 61/931,957 filed Jan. 27, 2014, both of which are hereby incorporated herein by reference in their entireties.

This invention was made with government support under Contract No. FA8650-09-D-2923/DO13 awarded by the United States Air Force. The government may have certain rights in the invention.

BACKGROUND

The present disclosure relates to variable cycle gas turbine engines, and more particularly to an exhaust mixer therefor.

Variable cycle gas turbine engines power aircraft over a range of operating conditions yet achieve countervailing objectives such as high specific thrust and low fuel consumption. The variable cycle gas turbine engine essentially alters its bypass ratio during flight to match requirements. This facilitates efficient performance over a broad range of altitudes and flight conditions to selectively generate high thrust for high-energy maneuvers and optimized fuel efficiency for cruise and loiter.

An exhaust nozzle enhances the thrust produced by the gas turbine engine. In variable cycle gas turbine engines, each flow stream may require a particular nozzle.

SUMMARY

A gas turbine engine, according to one disclosed non-limiting embodiment of the present disclosure, includes an outer case structure around a central longitudinal engine axis. An intermediate case structure is included inboard of the outer case structure. An inner case structure is included inboard of the intermediate case structure. A variable area exhaust mixer is included, which is movable between a closed position adjacent to the intermediate case structure and an open position adjacent to the inner case structure.

In a further embodiment of the present disclosure, the variable area exhaust mixer is downstream of a turbine section.

In a further embodiment of any of the foregoing embodiments of the present disclosure, the variable area exhaust mixer includes a hinge axis radially outboard of a maximum outer diameter of a tailcone.

In a further embodiment of any of the foregoing embodiments of the present disclosure, the hinge axis is axially aft of a multiple of respective flaps.

In a further embodiment of any of the foregoing embodiments of the present disclosure, the multiple of respective flaps open radially inward toward the inner case structure.

In a further embodiment of any of the foregoing embodiments of the present disclosure, the multiple of respective flaps are operable to extend toward a wall in the inner case structure, when between the closed position and the open position.

In a further embodiment of any of the foregoing embodiments of the present disclosure, the wall separates an exhaust of a second stream flow path and an exhaust of a core flow path.

In a further embodiment of any of the foregoing embodiments of the present disclosure, the multiple of respective flaps are operable to extend to the wall to segregates the second stream flow path and the core flow path.

In a further embodiment of any of the foregoing embodiments of the present disclosure, the variable area exhaust mixer is upstream of a tailcone.

In a further embodiment of any of the foregoing embodiments of the present disclosure, the variable area exhaust mixer is upstream of a nozzle section.

In a further embodiment of any of the foregoing embodiments of the present disclosure, the nozzle section includes a convergent/divergent nozzle.

A gas turbine engine, according to another disclosed non-limiting embodiment of the present disclosure, includes a third stream flow path, a second stream flow path inboard of the third stream flow path, a core flow path inboard of the second stream flow path, and a variable area exhaust mixer operable to control flow between the third stream flow path, the second stream flow path and the core flow path.

In a further embodiment of any of the foregoing embodiments of the present disclosure, the variable area exhaust mixer is operable to segregate the core flow path in a position between the closed position and the open position.

In a further embodiment of any of the foregoing embodiments of the present disclosure, the variable area exhaust mixer is operable to selectively mix a core flow from the core flow path with a bypass flow stream of the third stream flow path and a second flow from the second stream flow path.

In a further embodiment of any of the foregoing embodiments of the present disclosure, the variable area exhaust mixer is downstream of a turbine section.

In a further embodiment of any of the foregoing embodiments of the present disclosure, the variable area exhaust mixer includes a hinge axis radially outboard of a maximum outer diameter of a tailcone.

In a further embodiment of any of the foregoing embodiments of the present disclosure, the hinge axis is axially aft of a multiple of respective flaps.

A method of operating a gas turbine engine, according to another disclosed non-limiting embodiment of the present disclosure, includes selectively controlling flow between a third stream flow path, a second stream flow path and a core flow path downstream of turbine section.

In a further embodiment of any of the foregoing embodiments of the present disclosure, the method includes segregating the third stream flow path from the second stream flow path and the core flow path.

In a further embodiment of any of the foregoing embodiments of the present disclosure, the method includes segregating the core flow path from the third stream flow path and the second stream flow path.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
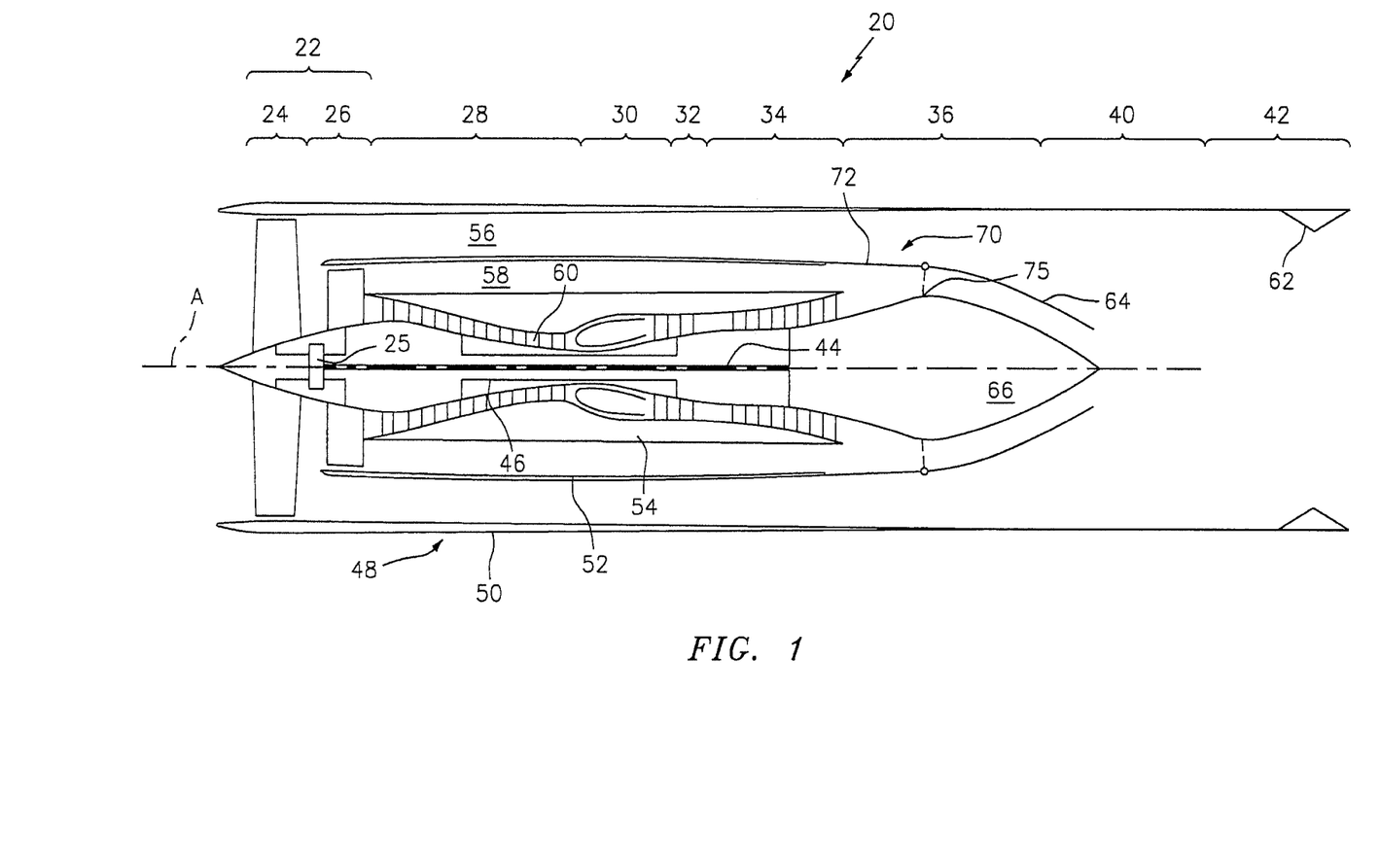
FIG. 1 is a general sectional schematic view of an exemplary variable cycle gas turbine engine with a variable area exhaust mixer according to one disclosed non-limiting embodiment in a closed position.

FIG. 1 schematically illustrates a gas turbine engine 20. The gas turbine engine 20 is disclosed herein as a variable cycle two-spool bypass turbofan that generally includes: a fan section 22 with a first fan section 24 and a second fan section 26; a high pressure compressor section 28; a combustor section 30; a high pressure turbine section 32; a low pressure turbine section 34; an exhaust duct section 36; an augmentor section 40 and a nozzle section 42. Additional sections, systems and features such as a geared architecture 25 may be located in various engine sections, for example, between the fan sections 24, 26 or aft of the low pressure turbine section 34. The sections are defined along a central longitudinal engine axis A about which a low spool 44 and a high spool 46 rotate relative to an engine case structure 48. Although a particular architecture is disclosed in the various non-limiting embodiment, it should be appreciated that other architectures, such as three-spool architectures, will also benefit herefrom.

The engine case structure 48 generally includes an outer case structure 50, an intermediate case structure 52 and an inner case structure 54. It should be appreciated that various integral or assembled structures, may form the case structure 48 to essentially define an exoskeleton that supports the spools 44, 46 for rotation therein. A third stream flow path 56 is generally defined by the outer case structure 50 and the intermediate case structure 52. A second stream flow path 58 is generally defined by the intermediate case structure 52 and the inner case structure 54. A core flow path 60 is generally defined by the inner case structure 54. The second stream flow path 58 is defined radially inward of the third stream flow path 56 and the core flow path 60 is radially inward of the second stream flow path 58.

The first fan section 24 communicates the bypass flow stream into a third stream flow path 56, a second stream flow path 58 and a first or primary core flow path 60 that is in communication with the combustor section 30. The second fan section 26 communicates a second flow stream into the second stream flow path 58 and the core flow path 60. The second fan section 26 is generally radially inboard and downstream of the first fan section 24 such that all flow from the second fan section 26 is communicated into the second stream flow path 58 and the core flow path 60. The fan section 22 may alternatively or additionally include other architectures that, for example, include additional or fewer sections each with or without various combinations of variable or fixed guide vanes.

The first fan section 24 and the second fan section 26 directs airflow into the core flow path 60 such that the core flow stream is further compressed by the high pressure compressor section 28, mixed and burned with fuel in the combustor section 30, then expanded over the turbine sections 32, 34 to rotationally drive the respective high spool 46 and low spool 44 in response to the expansion. The core flow path 60 may alternatively or additionally include other architectures that, for example, include additional or fewer sections and or stages each with or without various combinations of variable or fixed guide vanes.

Downstream of the turbine sections 32, 34, the exhaust duct section 36 may be circular in cross-section as typical of an axis-symmetric augmented low bypass turbofan or may include non-axisymmetric cross-section segments. In addition to the various cross-sections, the exhaust duct section 36 may be non-linear with respect to the central longitudinal engine axis A. Furthermore, in addition to the various cross-sections and the various longitudinal shapes, the exhaust duct section 36 may terminate in the nozzle section 42.

The nozzle section 42 may include a variable exhaust nozzle 62 at the end of the outer case structure 50 that receives flow from the third stream flow path 56, the second stream flow path 58 and the core flow path 60 such as within an embedded engine architecture. It should be understood that various fixed, variable, convergent/divergent, two-dimensional and three-dimensional nozzle systems may be utilized herewith. Alternatively, a variable exhaust nozzle 64 at the end of the intermediate case structure 52 that receives the second flow from the second stream flow path 58 and the core flow path 60 may be provided for a podded engine architecture. Alternatively or in addition thereto, a tailcone 66 may be selectively translated along axis A to further modulate the flow from the second stream flow path 58 and the core flow path 60.

In one disclosed non-limiting embodiment, the intermediate case structure 52 includes a variable area exhaust mixer 70. The variable area exhaust mixer 70 may be located downstream of the of the turbine sections 32, 34 and axially adjacent to the tailcone 66 for control of a flow stream mixture from the third stream flow path 56, the second stream flow path 58 and the core flow path 60. In other words, the variable area exhaust mixer 70 may be axially located adjacent to an exhaust mixing plane where the core flow path 60 joins the second stream flow path 58.

The variable area exhaust mixer 70 facilitates variable-cycle engine operations and maintains stall margin requirements though alteration of a fan-to-core area ratio at the exhaust mixing plane in response to desired operating condition. The variable area exhaust mixer 70 further facilitates a desired flow stream mixing to match, for example, engine operating conditions, ambient conditions and mission requirements. The variable area exhaust mixer 70 may be of various styles to include but not be limited to hinging, pivoting, sliding, rotating or other movable structures, to achieve the selective desired mixing of the contributing flow streams.

Figure 2:
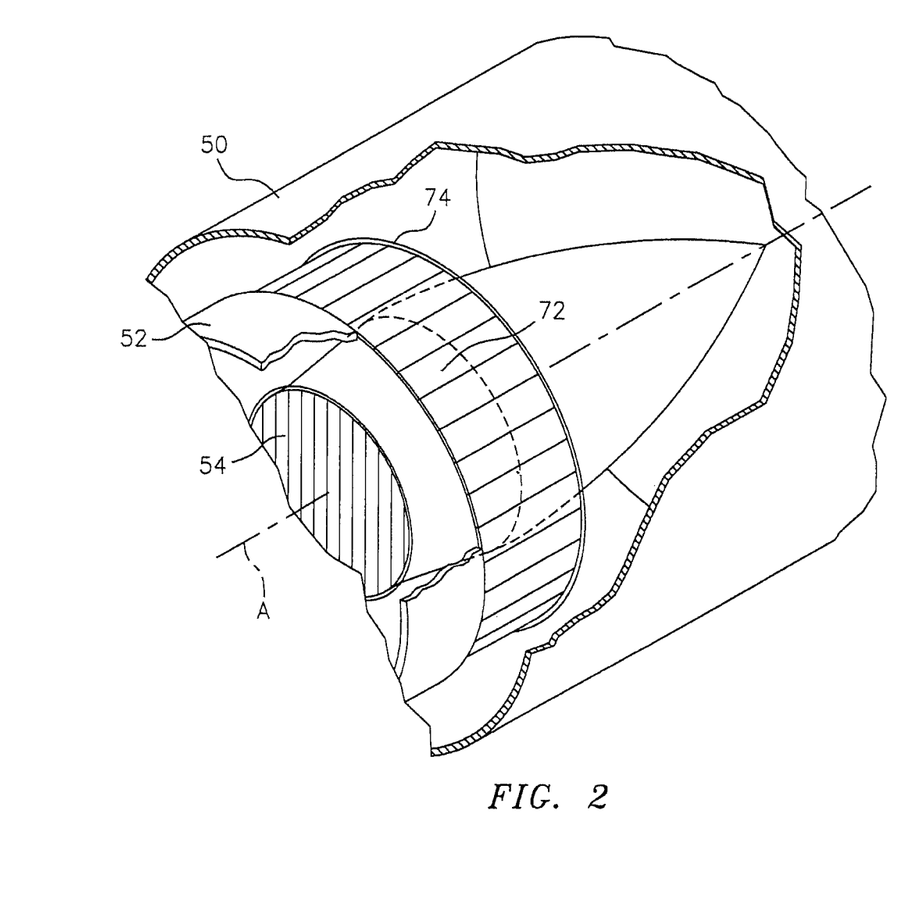
FIG. 2 is an expanded general schematic view of a variable area exhaust mixer according to one non-limiting embodiment in a closed position.
Figure 3:
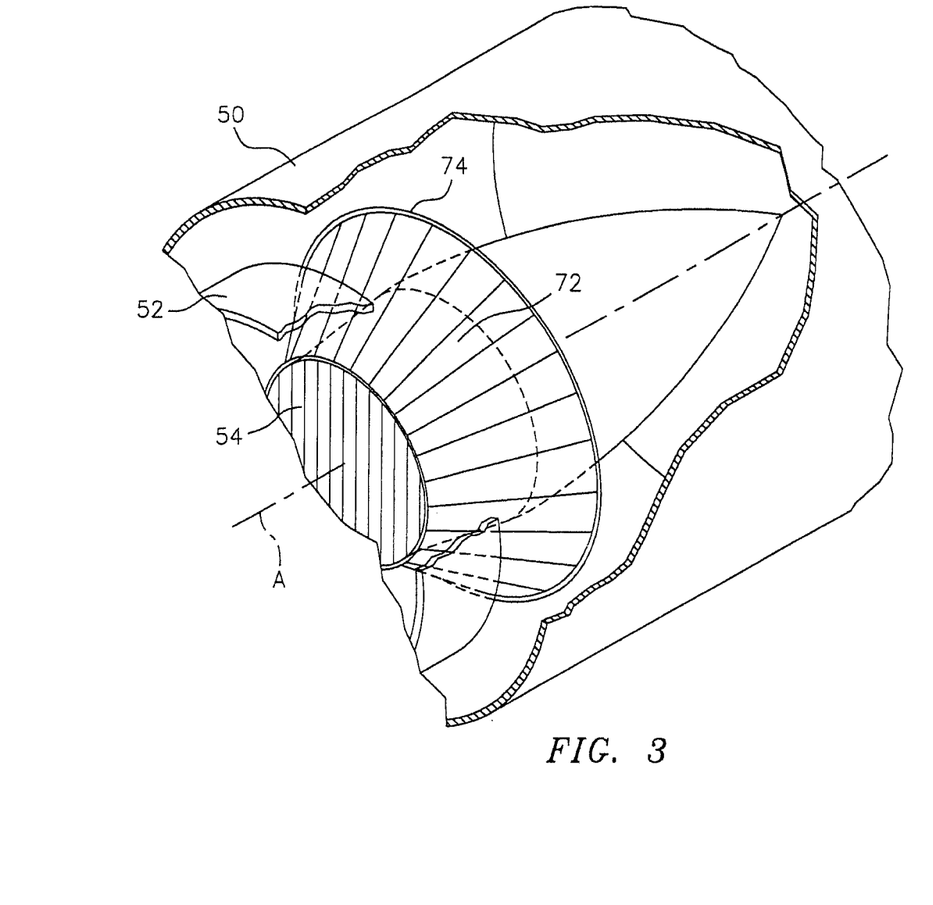
FIG. 3 is an expanded general schematic view of the variable area exhaust mixer of FIG. 2 in an open position.

In one disclosed non-limiting embodiment, the variable area exhaust mixer 70 is an iris-type mechanism with a multiple of flaps 72 (also shown in FIGS. 2 and 3) that move about a hinge axis 74 at the intermediate case structure 52. Each flap 72 moves relative to the intermediate case structure 52 at the hinge axis 74 and may at least partially circumferentially overlap when moved between the closed position (see FIG. 1) and the open position (see FIG. 6) with continuous variability therebetween (one position shown in FIG. 7).

Figure 4:
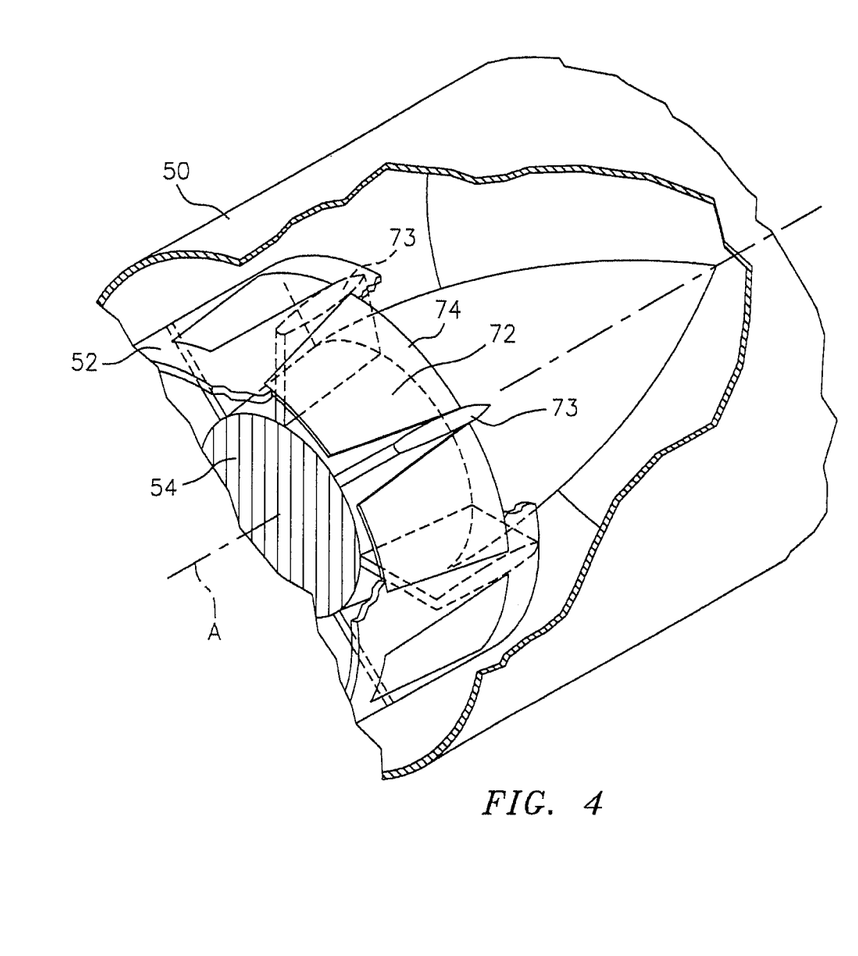
FIG. 4 is an expanded general schematic view of a variable area exhaust mixer according to one non-limiting embodiment in a closed position.
Figure 5:
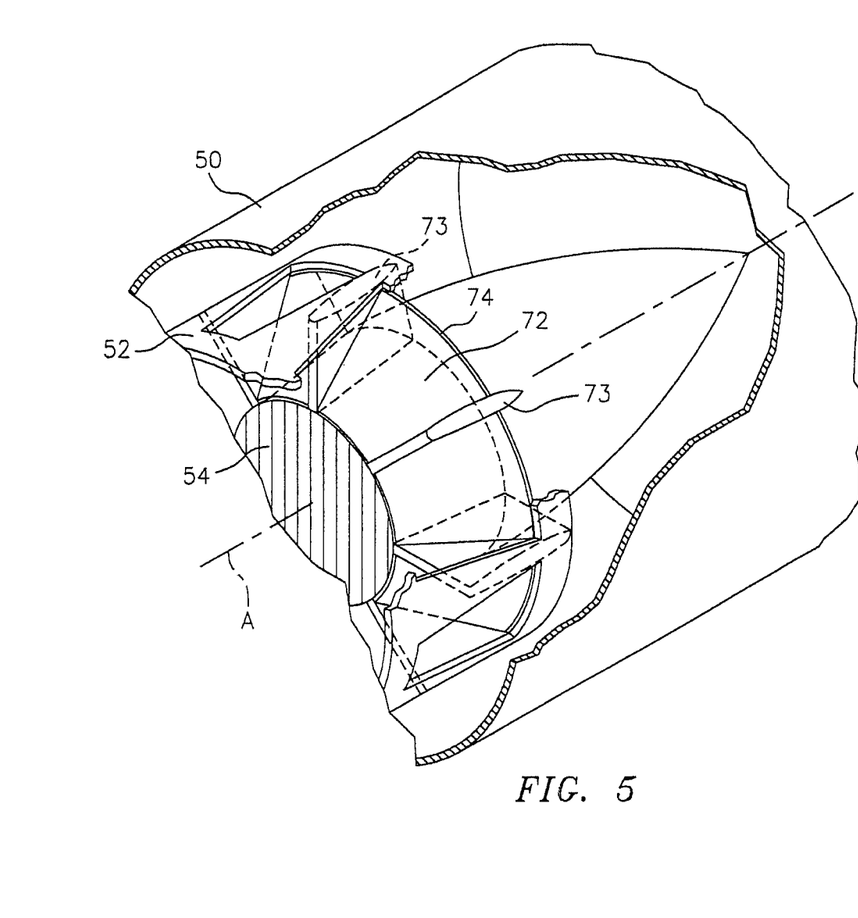
FIG. 5 is an expanded general schematic view of the variable area exhaust mixer of FIG. 4 in an open position.

In one disclosed non-limiting embodiment, the hinge axis 74 may be axially located aft of the respective flaps 72 and radially outboard of a maximum outer diameter 75 of the tailcone 66. It should be appreciated that the "hinge axis" mechanism as described herein may include various articulation mechanisms generally located within or at least partially formed by the intermediate case structure 52. In another disclosed non-limiting embodiment, the flaps 72 move amid struts 73 that extend between the intermediate case structure 52 and the inner case structure 54 (see FIGS. 4 and 5).

With continued reference to FIG. 1, when in the closed position, the flaps 72 are aligned with the intermediate case structure 52 to separate the bypass flow stream of the third stream flow path 56 from the mixed flow stream of the second stream flow path 58 and the core flow path 60. The closed position facilities full exhaust mixing and cooling for cruise operations. This cruise power setting mode maximizes the backpressure at the exit of the turbine section 34 and increases the pressure ratio of the second fan section 26. The turbine section 34 power input to the fan sections 24, 26 is thereby reduced and the backpressure at the exit of the first fan section 24 is minimized. This flow maximization and pressure ratio minimization of the first fan section 24 produces a relatively lower thrust with a relatively higher propulsive efficiency for cruise operations. This cruise power setting mode has a relatively lower turbine inlet temperature versus a maximum power setting mode (see FIG. 6).

Figure 6:
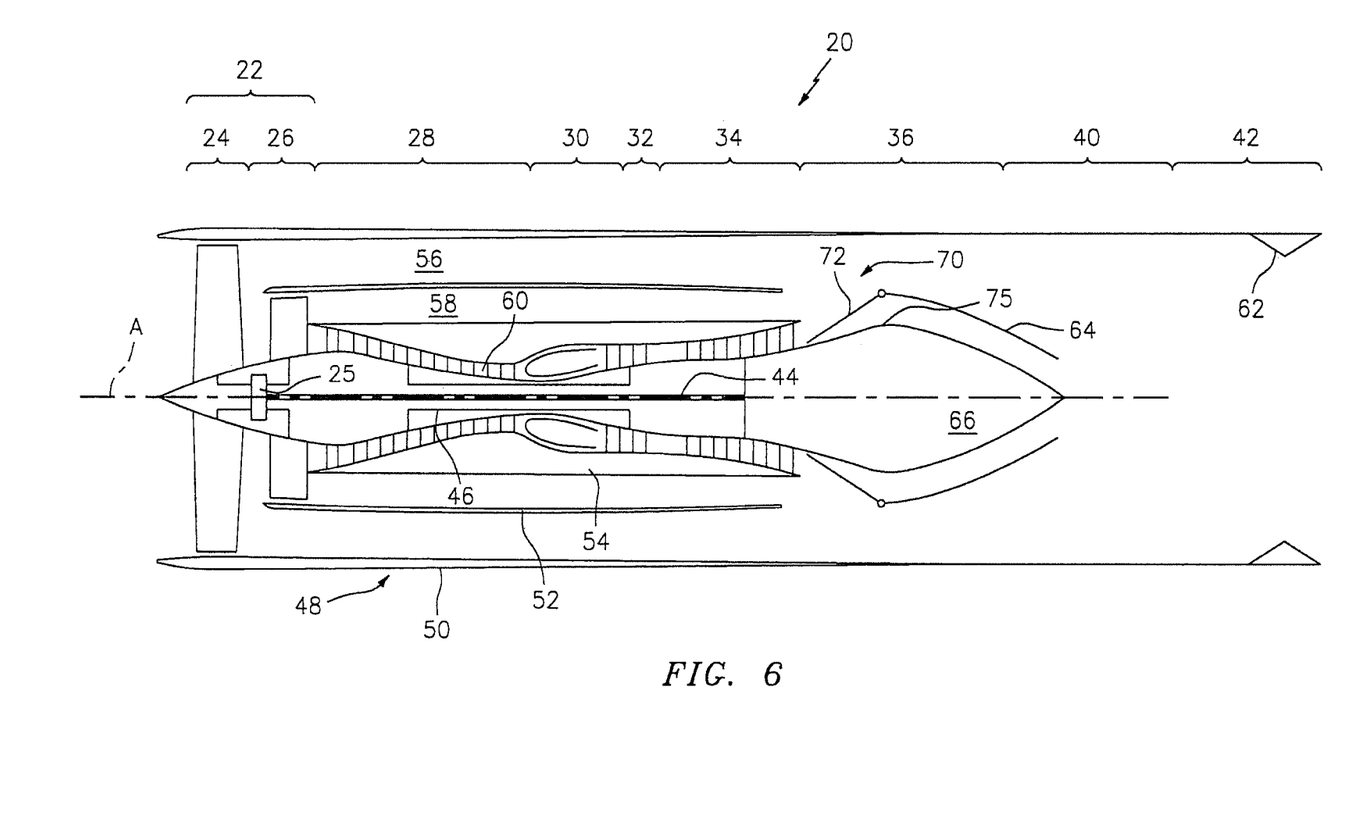
FIG. 6 is a general sectional schematic view of the exemplary variable cycle gas turbine engine of FIG. 1 with the variable area exhaust mixer in an open position.

With reference to FIG. 6, when in the open position, the flaps 72 are articulated to be adjacent to the inner case structure 54. The open position mixes the flow streams from the second stream flow path 58 and the core flow path 60 into the bypass flow stream in the third stream flow path 56 to facilitate full fan mixing and pressure modulation of the streams.

As the flaps 72 are closed toward the inner case structure 54 (see FIG. 7) to the maximum power setting mode (see FIG. 6), the flaps 72 first mix the third flow stream of the third stream flow path 56 with the second flow stream of the second stream flow path 58 and then further mixes the mixed third and second flow streams with the core flow stream 60 of the core flow path 60. This favors an architecture for the turbine section 34 that expands to a lower backpressure as consistent with a relatively low specific thrust class engine.

Figure 7:
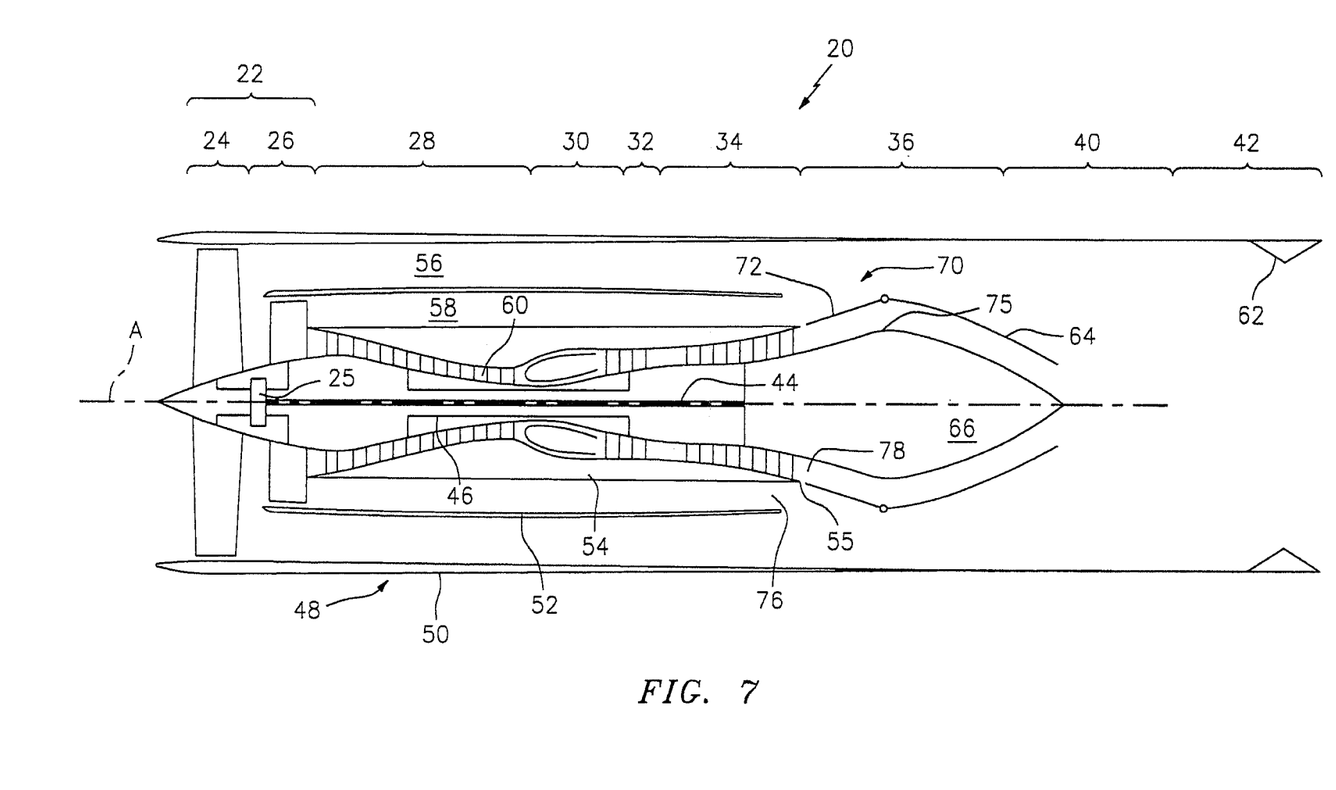
FIG. 7 is a general sectional schematic view of the exemplary variable cycle gas turbine engine of FIG. 1 with the variable area exhaust mixer in an intermediate position.

With reference to FIG. 7, when in an intermediate position, the flaps 72 extend at least partially toward the inner case structure 54. The intermediate position may be selectively varied to modulate the distribution of the flow stream of the second stream flow path 58 into the respective bypass flow stream of the third stream flow path 56 and the core flow stream of the core flow path 60. In this disclosed non-limiting embodiment, the flaps 72 may extend adjacent to a wall 55 of the inner case structure 54 that separates the exhaust 76 of the second stream flow path 58 and the exhaust 78 of the core flow path 60. That is, the core flow stream of the core flow path 60 may be substantially segregated from the mixed flow streams of the second stream flow path 58 and the third stream flow path 56. Variation of the variable area exhaust mixer 70 can be readily controlled to enhance, for example, the throttle transient response of the engine by modulation of the turbine section 34 power and backpressure to fan sections 24, 26.

Figure 8:
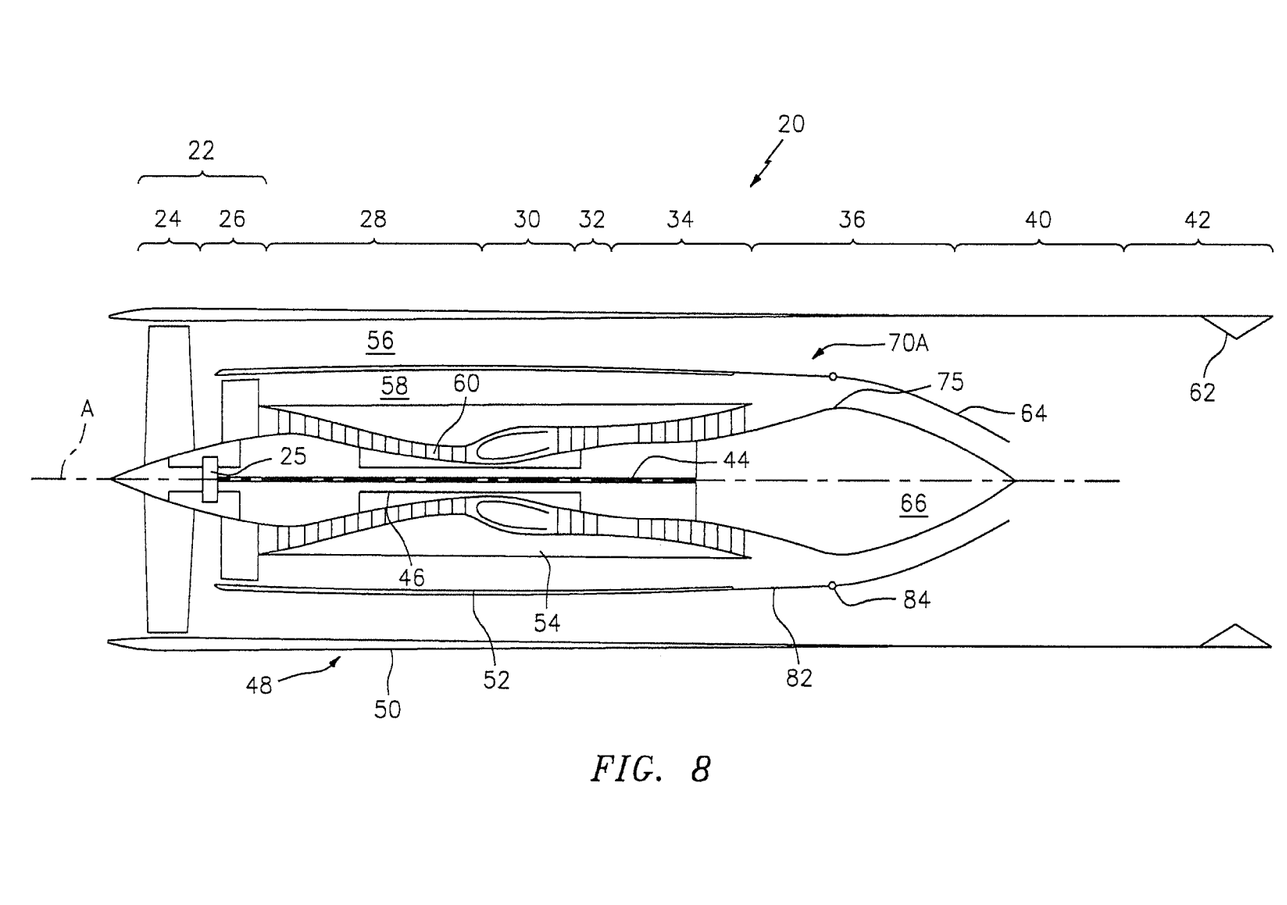
FIG. 8 is a general sectional schematic view of an exemplary variable cycle gas turbine engine with a variable area exhaust mixer according to another disclosed non-limiting embodiment in a closed position.

With reference to FIG. 8, in another disclosed non-limiting embodiment, the inteimediate case structure 52 includes a variable area exhaust mixer 70A with a multiple of flaps 82 that move relative to a hinge axis 84 formed at the intermediate case structure 52. In this disclosed non-limiting embodiment, the flaps 82 of the variable area exhaust mixer 70A may extend further upstream with respect to the tailcone 66 than in the above-disclosed non-limiting embodiment to facilitate mixture control between the flow streams of the third stream flow path 56 and the second stream flow path 58. That is, the flaps 82 are relatively longer than the flaps 72 such that the flaps 82 achieve an open position adjacent to the intermediate case structure 52 (FIG. 9).

Figure 9:
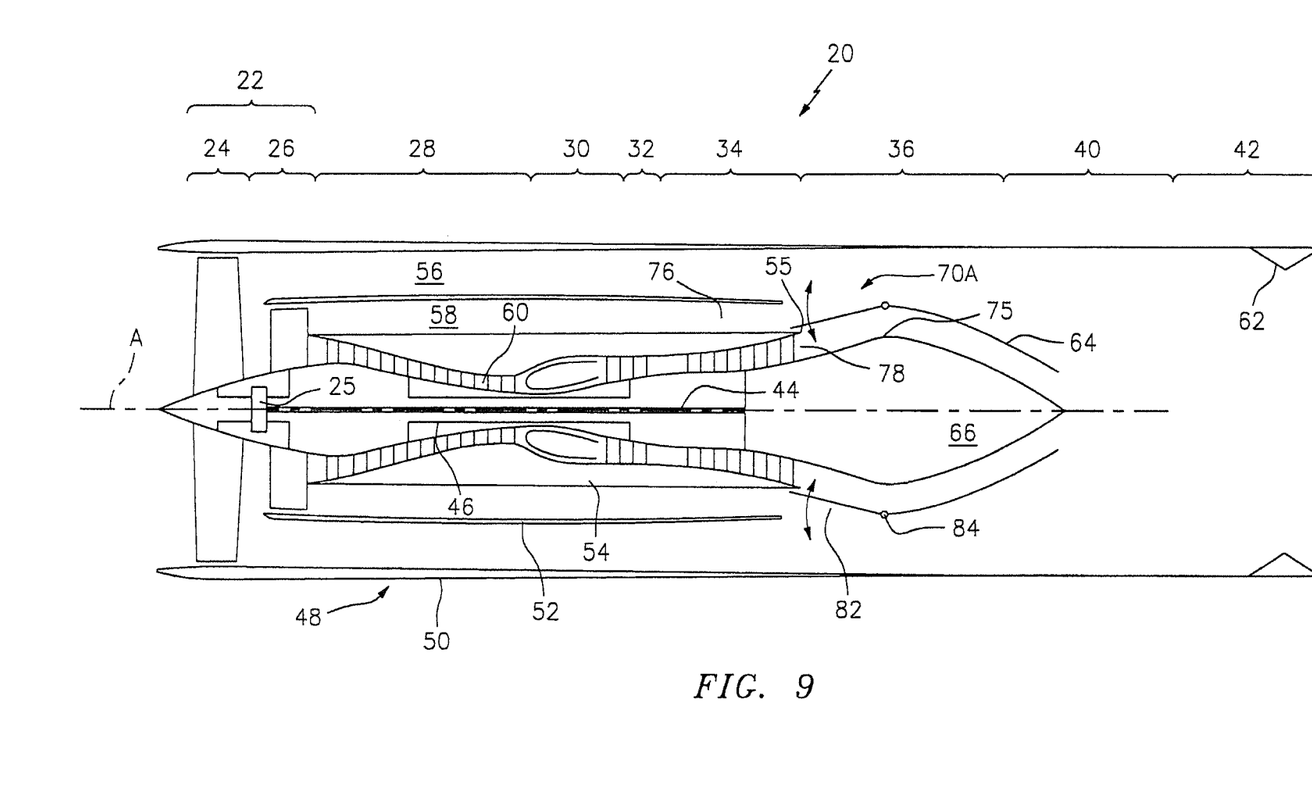
FIG. 9 is a general sectional schematic view of the exemplary variable cycle gas turbine engine of FIG. 8 with the variable area exhaust mixer in an open position.

With reference to FIG. 9, when in the open position, the variable area exhaust mixer 70A mixes the third flow stream of the third stream flow path 56 with the second flow stream of the second stream flow path 58. This mode minimizes the backpressure at the exit of the turbine section 34 and decreases the pressure ratio of the second fan section 26 to increase the power available to drive the first fan section 24. The turbine section 34 power input to the fan sections 24, 26 is thereby increased and the backpressure at the exit of the first fan section 24 is maximized. This flow minimization and pressure ratio maximization of the first fan section 24 produces a relatively high specific thrust (engine thrust per lbm per second of engine flow). The total thrust in this high specific thrust mode (see FIG. 9) is increased by operation of the turbine section 34 at a relatively higher inlet temperature than in cruise mode (see FIG. 8).

Figure 10:
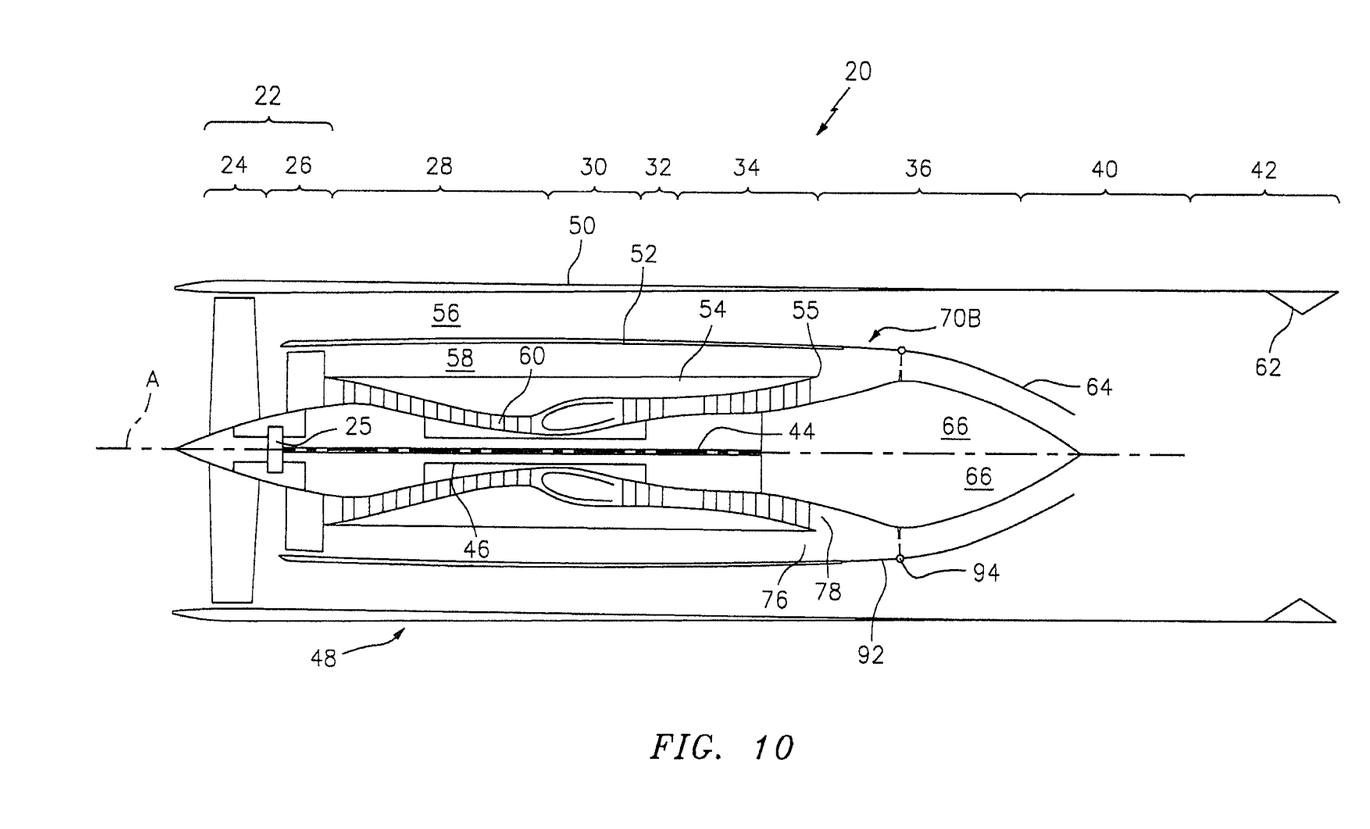
FIG. 10 is a general sectional schematic view of an exemplary variable cycle gas turbine engine with a variable area exhaust mixer according to another disclosed non-limiting embodiment in a closed position.
Figure 11:
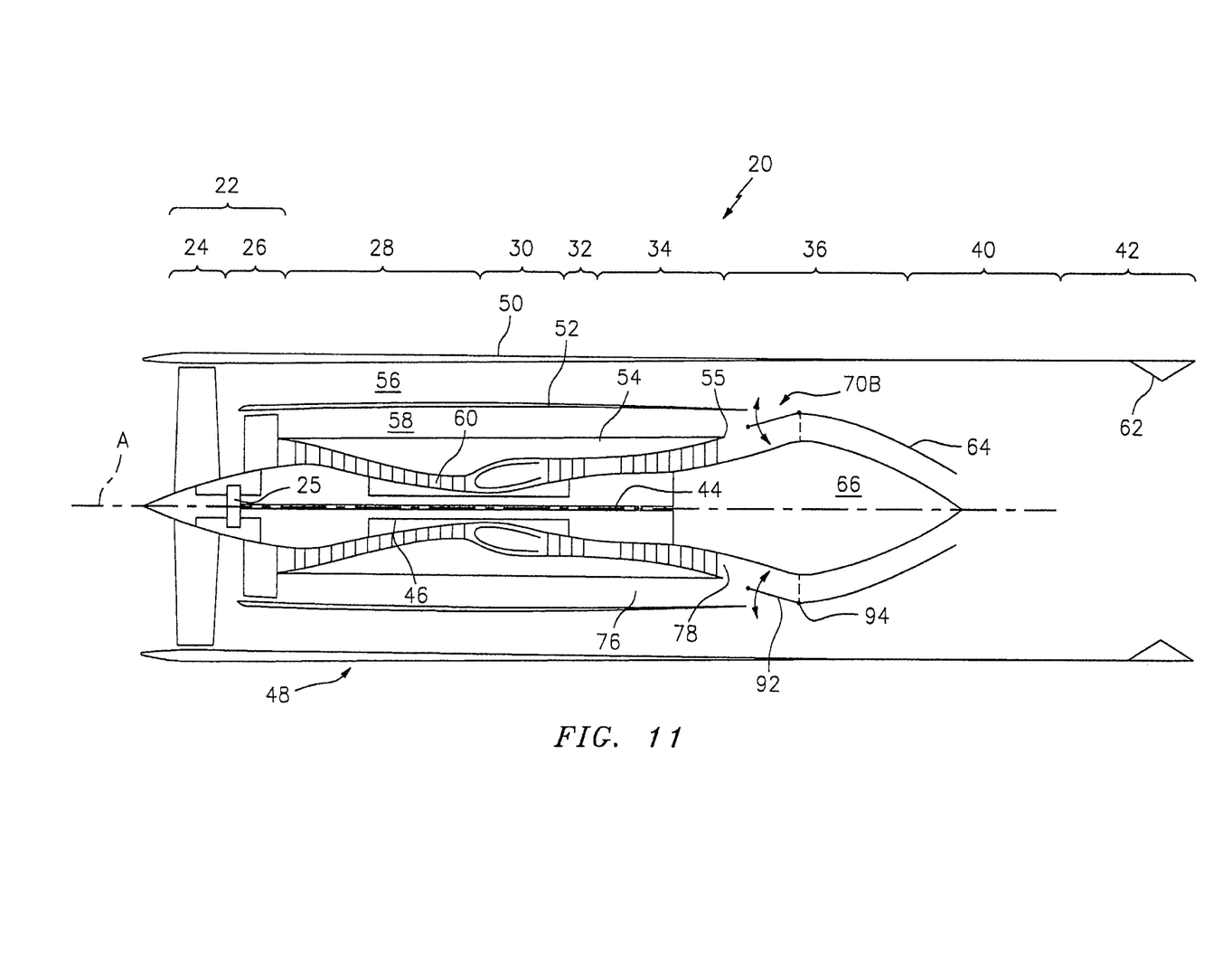
FIG. 11 is a general sectional schematic view of the exemplary variable cycle gas turbine engine of FIG. 10 with the variable area exhaust mixer in an intermediate position.
Figure 12:
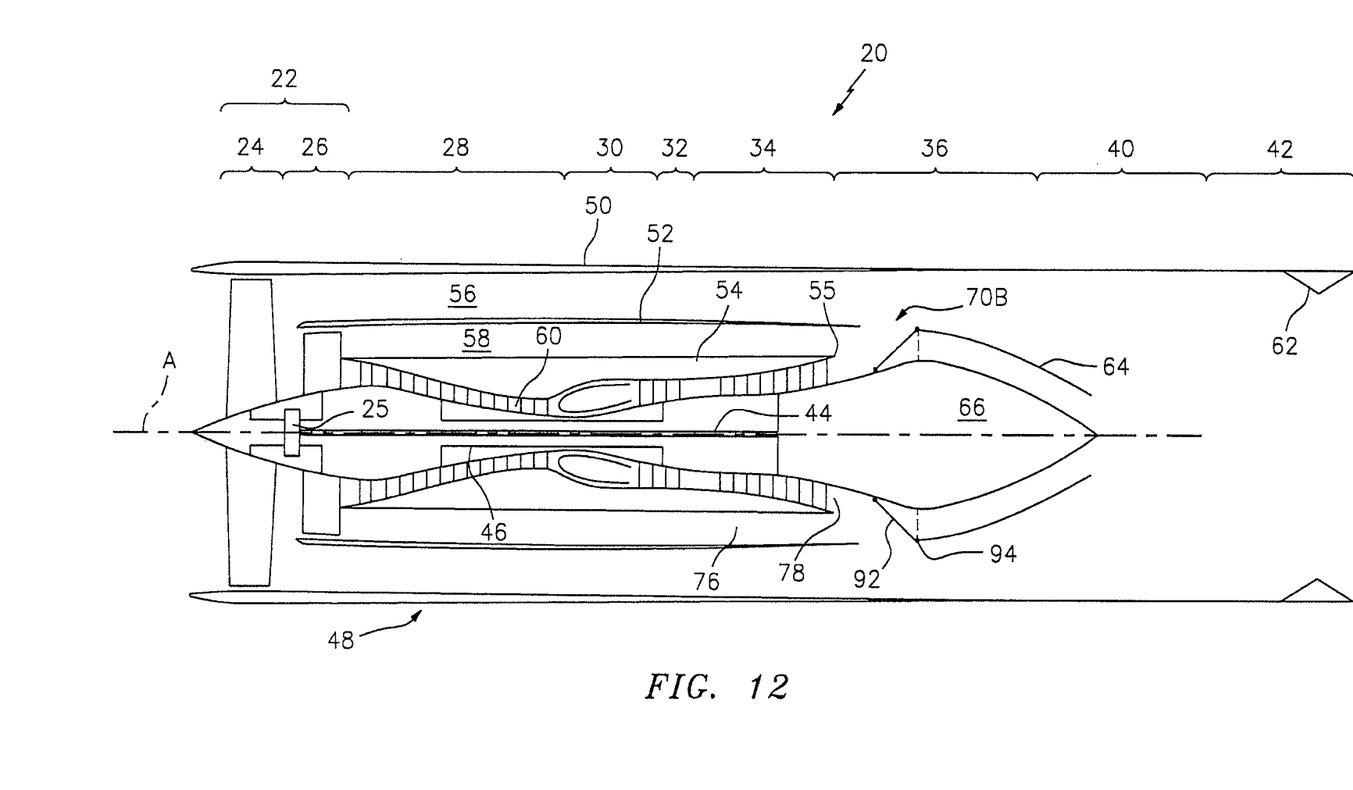
FIG. 12 is a general sectional schematic view of the exemplary variable cycle gas turbine engine of FIG. 10 with the variable area exhaust mixer in an open position.

With reference to FIGS. 10-12, in another disclosed non-limiting embodiment, the intermediate case structure 52 includes a variable area exhaust mixer 70B with a multiple of flaps 92 that move relative to a hinge axis 94 formed at the intermediate case structure 52. The variable area exhaust mixer 70B extends for a relative shorter distance upstream with respect to the tailcone 66 than in the above-disclosed non-limiting embodiments for mixture control between the flow streams from the third stream flow path 56, the second stream flow path 58 and the core flow path 60. That is, flaps 92 are relatively shorter than the flaps 72, 82 and are spaced from the wall 55 of the inner case structure 54 when in an intermediate position (FIG. 11).

When in the closed position (see FIG. 10) the flaps 92 are aligned with the intermediate case structure 52 to separate the bypass flow stream of the third stream flow path 56 from the mixed flow stream of the second stream flow path 58 and the core flow path 60 as described above.

The variable area exhaust mixer 70B changes the sequence of mixing of the flow streams 56, 58, and 60 for the high specific thrust mode. In this disclosed non-limiting embodiment, when articulated between the closed (see FIG. 10) and open position (see FIG. 12), the flaps 92 are displaced from the wall 55 of the inner case structure 54 that separates the exhaust 76 of the second stream flow path 58 and the exhaust 78 of the core flow path 60.

As the flaps 92 close through the intermediate position (see FIG. 11) to the maximum power setting mode (see FIG. 12), the flaps 92, being relatively short, first mix the core flow stream of the core flow path 60 with the second flow stream of the second stream flow path 58 then mixes the mixed second and core flow streams with the third flow stream of the third stream flow path 56. This favors a turbine section 34 architecture that expands less, i.e., the pressure at the exit of the turbine section 34 is consistent with a relatively high specific thrust class engine that, in this disclosed non-limiting embodiment, is higher than the engine embodiments described above.

When in the intermediate position (one shown FIG. 11) the flaps 92 are articulated at least partially toward the inner case structure 54 so that a selectively controlled fraction of the second flow stream of the second stream flow path 58 mixes with the flow stream of the third stream flow path with the remainder mixed with the core flow stream of the core flow path 60. The position of the flaps 92 are controlled to enhance the throttle transient response of the engine by affecting the turbine section 34 power and backpressure to fan sections 24, 26.

When included in a three-stream engine, the variable area exhaust mixer provides for variable mixing and cooling between the core flow stream and either or both the mid flow stream and bypass flow stream. The variable area exhaust mixer facilitates the provision of metered, on-demand cooling and mixing to the exhaust flow stream, protects temperature sensitive materials and blocks direct view to the turbine sections. For cruise operations, the Mach numbers in the second flow stream mixing section are relatively low and pressure losses are reduced.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A gas turbine engine, comprising:
   an outer case structure around a central longitudinal engine axis;
   an intermediate case structure inboard of the outer case structure;
   an inner case structure inboard of the intermediate case structure; and
   a variable area exhaust mixer movable between a closed position adjacent to the intermediate case structure and an open position adjacent to the inner case structure at a position radially inward of a first stream flow path defining a core flowpath, the variable area exhaust mixer including a hinge axis radially outboard of a maximum outer diameter of a tailcone, the hinge axis axially aft of a multiple of respective flaps;
   wherein the multiple of respective flaps are operable to extend toward a wall in the inner case structure when between the closed position and the open position; and
   wherein the wall separates an exhaust of a second stream flow path and an exhaust of the core flow path.

2. The gas turbine engine as recited in claim 1, wherein the variable area exhaust mixer is downstream of a turbine section.

3. The gas turbine engine as recited in claim 1, wherein the multiple of respective flaps open radially inward toward the inner case structure.

4. The gas turbine engine as recited in claim 1, wherein the multiple of respective flaps are operable to extend to the wall to segregate the second stream flow path and the core flow path.

5. The gas turbine engine as recited in claim 1, wherein the variable area exhaust mixer is upstream of the tailcone.

6. The gas turbine engine as recited in claim 1, wherein the variable area exhaust mixer is upstream of a nozzle section.

7. The gas turbine engine as recited in claim 6, wherein the nozzle section includes a convergent/divergent nozzle.

8. A gas turbine engine, comprising:
   a third stream flow path;
   a second stream flow path inboard of the third stream flow path;
   a first stream flow path defining a core flow path, the core flow path inboard of the second stream flow path; and
   a variable area exhaust mixer operable to control flow between the third stream flow path, the second stream flow path and the core flow path, the variable area exhaust mixer including a hinge axis radially outboard of a maximum outer diameter of a tailcone, wherein the variable area exhaust mixer is downstream of a turbine section and the hinge axis is axially aft of a multiple of respective flaps, wherein in an open position the variable area exhaust mixer mixes a bypass flow stream, a second flow stream, and a core flow stream from the third stream flow path, second stream flow path, and core flow path, respectively, into the bypass flow stream.

9. The gas turbine engine as recited in claim 8, wherein the variable area exhaust mixer is operable to segregate the core flow path in a position between a closed position and the open position.

10. The gas turbine engine as recited in claim 8, wherein the variable area exhaust mixer is operable to selectively mix the core flow stream from the core flow path with the bypass flow stream from the third stream flow path and the second flow stream from the second stream flow path.

* * * * *